United States Patent
Harashima et al.

(10) Patent No.: US 7,398,708 B2
(45) Date of Patent: Jul. 15, 2008

(54) PEDAL SUPPORT STRUCTURE FOR VEHICLE

(75) Inventors: Hitoshi Harashima, Tokyo (JP); Takamune Oono, Tokyo (JP); Osamu Yamaguchi, Isezaki (JP)

(73) Assignees: Fuji Jukogyo Kabushiki Kaisha, Tokyo (JP); Chiyoda Industry Co., Ltd., Gunma Pref. (JP)

( * ) Notice: Subject to any disclaimer, the term of this patent is extended or adjusted under 35 U.S.C. 154(b) by 662 days.

(21) Appl. No.: 10/851,501

(22) Filed: May 21, 2004

(65) Prior Publication Data

US 2004/0231453 A1 Nov. 25, 2004

(30) Foreign Application Priority Data

May 21, 2003 (JP) .............................. 2003-143675

(51) Int. Cl.
*G05G 1/14* (2006.01)
*B60K 28/10* (2006.01)

(52) U.S. Cl. .............................. 74/512; 74/513; 74/560; 180/274

(58) Field of Classification Search .................. 74/512, 74/513, 560, 492; 180/274; 280/748, 779; 296/75; *B60T 7/06; G05G 1/14; B60K 28/10*
See application file for complete search history.

(56) References Cited

U.S. PATENT DOCUMENTS

| | | | | |
|---|---|---|---|---|
| 5,181,435 A | * | 1/1993 | Khalifa et al. | 74/492 |
| 6,142,036 A | * | 11/2000 | Mizuma et al. | 74/512 |
| 6,408,711 B1 | * | 6/2002 | Mizuma et al. | 74/512 |
| 6,742,411 B2 | * | 6/2004 | Aoki et al. | 74/512 |
| 6,761,389 B2 | * | 7/2004 | Akasaka et al. | 296/75 |
| 6,810,766 B2 | * | 11/2004 | Mizuma | 74/512 |
| 7,011,339 B2 | * | 3/2006 | Oono et al. | 280/748 |
| 7,086,665 B2 | * | 8/2006 | Lee | 280/779 |

(Continued)

FOREIGN PATENT DOCUMENTS

JP      10-310036      11/1998

(Continued)

OTHER PUBLICATIONS

PTO 07-4069, Translation of JP 10-310036, USPTO, May 2007.*

(Continued)

*Primary Examiner*—Vinh T. Luong
(74) *Attorney, Agent, or Firm*—Smith, Gambrell & Russell, LLP

(57) ABSTRACT

A pedal support structure for a vehicle includes a main body provided between a catcher and a toe board. A front end of the main body is connected to the toe board, and a rear end thereof is spaced apart from a downwardly inclined surface of the catcher. A pedal bracket support part has a supporting surface supported on a bulkhead. The pedal bracket has a connecting surface, and the connecting surface is connected to the supporting surface. When a force is applied to a front part of the vehicle, the load rearwardly moves the main body, the connecting surface slides on the supporting surface, and the rear end of the main body slides downwardly along the inclined surface of the catcher. Accordingly, a pedal on the pedal support structure is moved toward an engine compartment of the vehicle without moving toward a passenger.

20 Claims, 9 Drawing Sheets

U.S. PATENT DOCUMENTS 7,090,046 B2 * 8/2006 Nebuya et al. .............. 180/274

FOREIGN PATENT DOCUMENTS

| JP | 11-20493 | * | 1/1999 |
| JP | 2001-151089 | * | 6/2001 |
| JP | 2002-293224 | * | 10/2002 |
| JP | 2003-112614 | | 4/2003 |

OTHER PUBLICATIONS

European Office Action dated Jul. 5, 2007 corresponding to European Application No. 04 253 000.6.
Patent Abstracts of Japan, vol. 2000, No. 01, Jan. 31, 2000 (for JP 11-268667).
Patent Abstracts of Japan, vol. 1998, No. 14, Dec. 31, 1998 (for JP 10-236288).

* cited by examiner

Prior Art

PEDAL SUPPORT STRUCTURE FOR VEHICLE

BACKGROUND OF THE INVENTION

1. Field of the Invention

The present invention relates to a pedal support structure for a vehicle, and particularly to a pedal support structure for supporting a brake or clutch pedal.

2. Discussion of the Related Art

A brake pedal for a vehicle is provided in front of a seat for a driver in a passenger compartment. The brake pedal has a pedal pad and a pedal lever, and is actuated by a driver. The pedal pad is used as a step-on (treadle) surface which the driver stamps. The pedal lever extends approximately in a vertical direction and has the pedal pad at a bottom end thereof. A top end of the pedal lever is supported on a pedal bracket so as to pivot thereon and the pedal bracket is fixed to a toe board. The toe board is a partition interposed between an engine compartment and the passenger compartment. In front of the toe board, i.e., on an engine compartment side with respect to the toe board, a master cylinder is provided for amplifying the stepping force by the driver. The master cylinder and the pedal lever is linked with each other via a pushrod.

There is such a possibility that the brake pedal with the above-mentioned structure is moved rearward, that is, in a direction toward a passenger when an external force, larger than a predetermined force is applied to the vehicle from the front. In this case, the external force pushes a power unit rearward, and the power unit pushes the master cylinder and the toe board toward the passenger compartment. Finally, the brake pedal supported by the pedal bracket is pushed rearward. In that event, there is such a possibility that a large load is applied to a foot placed on the pedal pad.

As a countermeasure to eliminate such possibility, several kinds of pedal support structures are proposed. One of the pedal support structures is, as shown in FIG. 8, contains a master cylinder 111 located in front of the toe board 101, namely on the side of the engine compartment. The master cylinder 111 and a front end of the pedal bracket 112 are connected to the toe board 101. On the other hand, a rear end 113 of the pedal bracket 112 is connected to a bulkhead 102 which horizontally extends on an upper end of the toe board 101 by fixing means 114. The fixing means 114 connects the pedal bracket 112 with the bulkhead 102 so as to make the pedal bracket 112 detachable from the bulkhead 102 when the pedal bracket 112 rearwardly moves with respect to the bulkhead 102.

FIG. 9 is a cross section of FIG. 8 which is cut along a line 9-9 of FIG. 8. As shown in the figure, the fixing member 114 contains a circular bolt hole 116 perforated in the bulkhead 102, and a bolt hole 117 having a portion 117a with a small diameter connected with a portion with a large diameter 117b. The portion 117b with a large diameter is provided in front of the portion 117a with respect to the lengthwise direction of the vehicle. The portion 117a with a small diameter is made so as that a shaft part of a bolt 115 can be inserted with remaining a small space between the portion 117a and a shaft part of the bolt 115. On the other hand, the portion 117b with a large diameter is prepared so as that a bolt head can pass through. The bolt 115 is inserted into the portion 117a with a small diameter as a part of the bolt hole 117 in the pedal bracket and the bolt hole 116 in the bulkhead 102. Then, the bolt 115 is screwed into a welded nut 118, and hence the pedal bracket 112 and the bulkhead contact and are connected to each other as shown in FIG. 8. The clamping force of the bolt 115 is set so as to keep the bracket 112 slidable with respect to the bulkhead 102 in a rear direction when a load in a rearward direction is applied to the pedal bracket 112 in the case of a collision.

As shown in FIG. 8, a downwardly inclined surface 103 is formed on the bulkhead 102. The inclined surface 103 is placed so as to face the rear end 113 of the pedal bracket 112, and rearwardly inclines toward a rear part of the vehicle. An upper end of a brake pedal 120 is supported by the pedal bracket so as to pivot thereon. The pedal 120 pivots in a lengthwise direction of the vehicle. Moreover, a pushrod 123 rearwardly extends from the master cylinder, and is linked to an intermediate part of the brake pedal 120. This structure is described, for instance, in Japanese Kokai Publication 10 (1998)-310036.

When a vehicle with the above-mentioned structure collides, the master cylinder 111 moves rearwardly with the deformation of the toe board 101. The pedal bracket 112 fixed to the toe board 101 rearwardly moves with respect to the bulkhead 102. By the rearward movement of the pedal bracket 112, the bolt 115 moves from the portion 117a with a small diameter to a portion 117b with a large diameter. The bolt 115 passes through the portion 117b with a large diameter. Accordingly, the connection between the pedal bracket 112 and the bulkhead 102 is released, and finally the pedal bracket 112 falls down by being disconnected from the bulkhead 102.

The pedal bracket 112 disconnected from the bulkhead 102 further moves rearwardly. Then, the rear end 113 of the pedal bracket 112 contacts the inclined surface 103, and the rear end 113 are downwardly pressed by the guidance of the inclined surface 103. As a result, the brake pedal 120 supported by the pedal bracket 112 pivots so as to forwardly move a pedal pad 102 provided at the bottom of the brake pedal 120. In this way, the master cylinder 111 and the pedal bracket 112 can rearwardly move by a frontal collision, the forward pivotal movement of the bottom of the brake pedal 120 helps to cancel (offset) the rearward movement of the master cylinder 111 and the pedal bracket 112. Therefore, the above-mentioned structure can decrease a load which could be applied to a foot or a leg of a passenger placed on the pedal pad 121 of the brake pedal 120 in the case of collision.

In the brake pedal support structure described in Japanese Kokai Publication 10 (1998)-310036, it is possible to prevent the brake pedal 120 supported on the pedal bracket 112 from moving toward a passenger compartment.

On an actual collision, however, the pedal bracket 112 detached from the bulkhead 102 may complicatedly move until the bracket 112 reaches the inclined surface 103. When the bulkhead 102 deforms, the inclined surface 103 could be deformed. Thus, the pedal bracket 112 detached from the deformed bulkhead 102 can behave in a complicated manner. Therefore, it is extremely difficult to assume (estimate) the behavior of the pedal bracket 112 and the pedal 120 supported by the pedal bracket 112. Hence, it is difficult to perform tuning of the support structure under estimating possible movement of relevant members, and there is such a possibility that safety for a passenger is not sufficiently attained.

On the other hand, when the pedal bracket 112 with a brake pedal or other member fitted thereto is mounted to a vehicle, an accurate positioning of members have to be carried out. Namely, it is necessary that the portion 117a with a small diameter formed in the bulkhead 102 have to be accurately positioned with respect to the bolt hole 116 in the pedal bracket 112. The bulkhead 102 and the pedal bracket 112 have to be connected by a bolt 115 after the positioning with high accuracy. When the accurate assembly cannot be obtained, the detaching behavior of the pedal bracket 112 from the bulkhead 102 becomes unstable. Based on the unstable detachment, the pedal bracket 112 also behaves in an unstable manner and it is possible that a desired effect cannot be obtained by the unstable behavior.

Since the pedal bracket 112 has to be mounted on a vehicle within a limited space in a passenger compartment of a vehicle, the mounting accuracy cannot always be attained. If the pedal bracket 112 is not accurately mounted, it is possible that the reliability on safety is decreased.

OBJECT AND SUMMARY OF THE INVENTION

It is therefore a first object of the present invention to provide a pedal support structure for use in a vehicle which increases safety of an occupant (driver) when an impact is applied to the front of a vehicle by effectively preventing a pedal from moving in a direction toward a passenger compartment by a stable rearward movement of a pedal bracket main body.

The first object is achieved by a pedal support structure for a vehicle comprising a toe board; a catcher having a downwardly inclined surface facing the toe board and inclining in a rearward direction of the vehicle; a pedal bracket provided between the toe board and the catcher and extending in a lengthwise direction of the vehicle; and a pedal including a pedal lever supported on the pedal bracket via a shaft; the pedal bracket including: a pedal bracket main body supporting the pedal lever and extending in a lengthwise direction of the vehicle, a front end of the pedal bracket main body connected to the toe board, a rear end of the pedal bracket main body opposing the downwardly inclined surface of the catcher, and the rear end being spaced apart from the downwardly inclined surface; and a guide member guiding the rear end of the pedal bracket main body toward the downwardly inclined surface of the catcher when an external force is applied from a front part of the vehicle to the toe board so that the rear end of the pedal bracket main body slides downwardly along the downwardly inclined surface of the catcher when the rear end of the pedal bracket main body moves further rearward.

It is preferable that the pedal support structure for a vehicle further comprise a bulkhead and a pedal bracket support part supported on the bulkhead, the pedal bracket support part having a supporting surface and flanges formed on lateral sides of the supporting surface so as to extend in the lengthwise direction of the vehicle, the supporting surface and the flanges constituting the guide member, the pedal bracket main body having a connecting surface, the supporting surface being superimposed on top of the connecting surface.

A second object of the present invention is to provide the pedal support structure for the vehicle which increases safety of an occupant when an impact is applied to the front of a vehicle by effectively preventing a pedal from moving in a direction toward a passenger compartment by stable rearward movement of a pedal bracket main body.

The second object can be achieved by a pedal support structure for a vehicle comprising: a toe board; a bulkhead; a catcher having a downwardly inclined surface facing the toe board and inclining in a rearward direction of the vehicle; a pedal bracket provided between the toe board and the catcher, and extending in a lengthwise direction of the vehicle; and a pedal including a pedal lever supported on the pedal bracket via a shaft; the pedal bracket including: a pedal bracket main body supporting the pedal lever and extending in a lengthwise direction of the vehicle, the pedal bracket having a main body front end, a connecting surface and a main body rear end extending from the connecting surface, the main body front end being connected to the toe board, the main body rear end opposing the downwardly inclined surface of the catcher and being spaced apart from the downwardly inclined surface; and a pedal bracket support part supported on the bulkhead and including a supporting surface and a support part rear end extending from the supporting surface, the supporting surface contacting the connecting surface of the pedal bracket main body, the supporting surface provided on the top of the connecting surface, the support part rear end protruding in a rearward direction of the vehicle with respect to the main body rear end, a back surface of the support part rear end being spaced apart from the main body rear end; and a connecting member sidably connecting the supporting surface and the connecting surface with each other to provide a connection between the supporting surface and the connecting surface; the connecting member permitting the pedal bracket main body and the pedal bracket support part to slide with respect to the pedal bracket support part when an external load is applied to the toe board from a front part of the vehicle, the pedal bracket main body sliding rearwardly with respect to the pedal bracket support part when the support part rear end is in contact with the downwardly inclined surface of the catcher, and the connection between the supporting surface being released and the main body rear end being downwardly guided along the downwardly inclined surface of the catcher when the main body rear end contacts the downwardly inclined surface.

A third object of the present invention is to provide the pedal support structure for the vehicle by which the pedal bracket support part and the pedal bracket main body are easily introduced to the catcher in a stable condition through the deformation of pedal fixing bracket.

The third object can be achieved by the pedal support structure further comprising a pedal fixing bracket provided on the bulkhead, the pedal bracket main body being supported on the bulkhead by the pedal fixing bracket.

A fourth object of the present invention is to provide the pedal support structure for the vehicle by which the pedal bracket main body can be easily moved downwardly, and the detachment of pedal bracket main body from the pedal bracket support part can be securely performed, and the pedal bracket main body can be effectively introduced in a downward direction.

The fourth object can be achieved by the pedal support structure for a vehicle, wherein the pedal bracket main body further comprises an offset part extending upwardly from a front edge of the connecting surface, the pedal bracket main body opposing a front surface of the pedal fixing bracket, the pedal bracket main body being pressed downwardly when the offset part contacts the front surface of the pedal fixing bracket and the pedal bracket main body moves rearwardly with respect to the vehicle.

A fifth object of the present invention is to provide the pedal support structure for the vehicle by which the pedal bracket main body can be introduced in a rearward direction more effectively.

The fifth object can be achieved by the pedal support structure for a vehicle, wherein the connecting surface of the pedal bracket main body includes main body flanges on lateral ends of the connecting surface, the main body flanges extending in a lengthwise direction with respect to the vehicle, and the supporting surface of the pedal bracket support part including supporting flanges on lateral ends thereof, the main body flanges respectively opposing the supporting flanges.

A sixth object of the present invention is to provide the pedal support structure for the vehicle wherein the connecting member has a simple structure.

The sixth object of the present invention can be achieved by the pedal support structure for a vehicle, wherein the connecting member comprises a bolt, the supporting surface, the connecting surface and a nut, the bolt having a shaft part and a bolt head, the supporting surface having a supporting surface bolt hole perforated therein, the connecting surface having a connecting surface bolt hole perforated therein, the bolt being screwed into the nut by passing through the supporting surface bolt hole and the connecting surface bolt hole, the supporting surface bolt hole including a small diameter part and a large diameter part extending from the small diameter part, the small diameter part having a diameter such that the shaft part can be inserted therein and the bolt head cannot pass therethrough, the large diameter part having a diameter such that the bolt head can pass therethrough, the connecting surface bolt hole having such a diameter that the shaft part can be inserted therein.

The sixth object of the present invention can also be achieved by the pedal support structure for a vehicle, wherein the connecting member comprises a bolt, the supporting surface, the connecting surface and a nut, the bolt having a shaft part and a bolt head, the supporting surface having a supporting surface bolt hole perforated therein, the connecting surface having a connecting surface bolt hole perforated therein, the bolt being screwed into the nut by passing through the supporting surface bolt hole and the connecting surface bolt hole, the supporting surface bolt hole having such a diameter that the shaft part can be inserted therein, the connecting surface bolt hole including a small diameter part and a large diameter part extending from the small diameter part, the small diameter part having such a diameter that the shaft part can be inserted therein and the bolt head cannot pass therethrough, the large diameter part having a diameter such that the bolt head can pass therethrough.

A seventh object of the present invention is to provide the pedal support structure for the vehicle wherein the pedal bracket main body has a simple structure with maintaining the rigidity.

The seventh object of the present invention can be achieved by the pedal support structure for a vehicle, wherein the connecting surface bolt hole facilitates installation of the pedal bracket support part.

An eighth object of the present invention is to provide the pedal support structure for a vehicle wherein the connecting surface and the rear end of the pedal bracket main body can be rigidly formed, and the pedal bracket main body can be downwardly guided efficiently.

The eighth object of the present invention can be achieved by the pedal support structure for a vehicle, further comprising a stopper bracket including an installation part having upper and lower parts and a pedal contacting portion provided at the lower part and the upper part being attached to the pedal bracket main body, and the pedal contacting portion regulating a pivotal movement of the pedal by contact of the pedal lever with the pedal contacting portion.

A ninth object of the present invention is to provide the pedal support structure for a vehicle wherein the pedal bracket main body can be smoothly guided on a supporting surface of the pedal bracket support part in a stable condition by the provision of the connecting surface and the supporting surface which extend substantially in the same direction.

The ninth object of the present invention can be achieved by the pedal support structure for a vehicle, wherein said connecting surface of said pedal bracket main body and said supporting surface of said pedal bracket support part horizontally extend in a lengthwise direction of the vehicle.

A tenth object of the present invention is to provide the pedal support structure for a vehicle wherein the rear part of the pedal bracket main body is smoothly introduced in a downward direction.

The tenth object of the present invention can be achieved by the pedal support structure for a vehicle, wherein the main body rear end and the support part rear end are downwardly inclined planes extending in a rearward direction of the vehicle.

A eleventh object of the present invention is to provide the pedal support structure for a vehicle by which the pedal bracket main body and the pedal moves in a stable condition by eliminating the swing of pedal bracket main body and the pedal in a widthwise direction of the vehicle.

The eleventh object of the present invention can be achieved by the pedal support structure for a vehicle, wherein the connecting surface of the pedal bracket main body and the supporting surface of the pedal bracket support part are symmetrically provided with respect to a center axis of the pedal in a widthwise direction of the pedal.

A twelfth object of the present invention is to provide the pedal support structure for a vehicle wherein the rear end of the pedal bracket can be downwardly guided in a stable condition with eliminating the swing of pedal bracket main body and the pedal in a widthwise direction of the vehicle.

The twelfth object of the present invention can be achieved by the pedal support structure for a vehicle, wherein said main body rear end and said supporting part rear end are symmetrically provided with respect to a center axis of said pedal in a widthwise direction of said pedal.

A thirteenth object of the present invention is to provide the pedal support structure for a vehicle wherein the rear end of the pedal bracket main body can be efficiently introduced in a downward direction.

The thirteenth object of the present invention can be achieved by the pedal support structure for a vehicle, wherein the connecting surface of the pedal bracket main body and the supporting surface of the pedal bracket support part are provided on a rear side with respect to where the bulkhead and the pedal bracket support part are connected with each other.

BRIEF DESCRIPTION OF THE DRAWINGS

The present invention becomes better understood by reference to the following detailed description when considered in connection with the accompanying drawings, wherein.

DETAILED DESCRIPTION OF THE INVENTION

Other features of this invention will be understood from the following description of exemplary embodiments, which are given for illustration of the present invention and are not intended to be limiting thereof.

Figure 1:
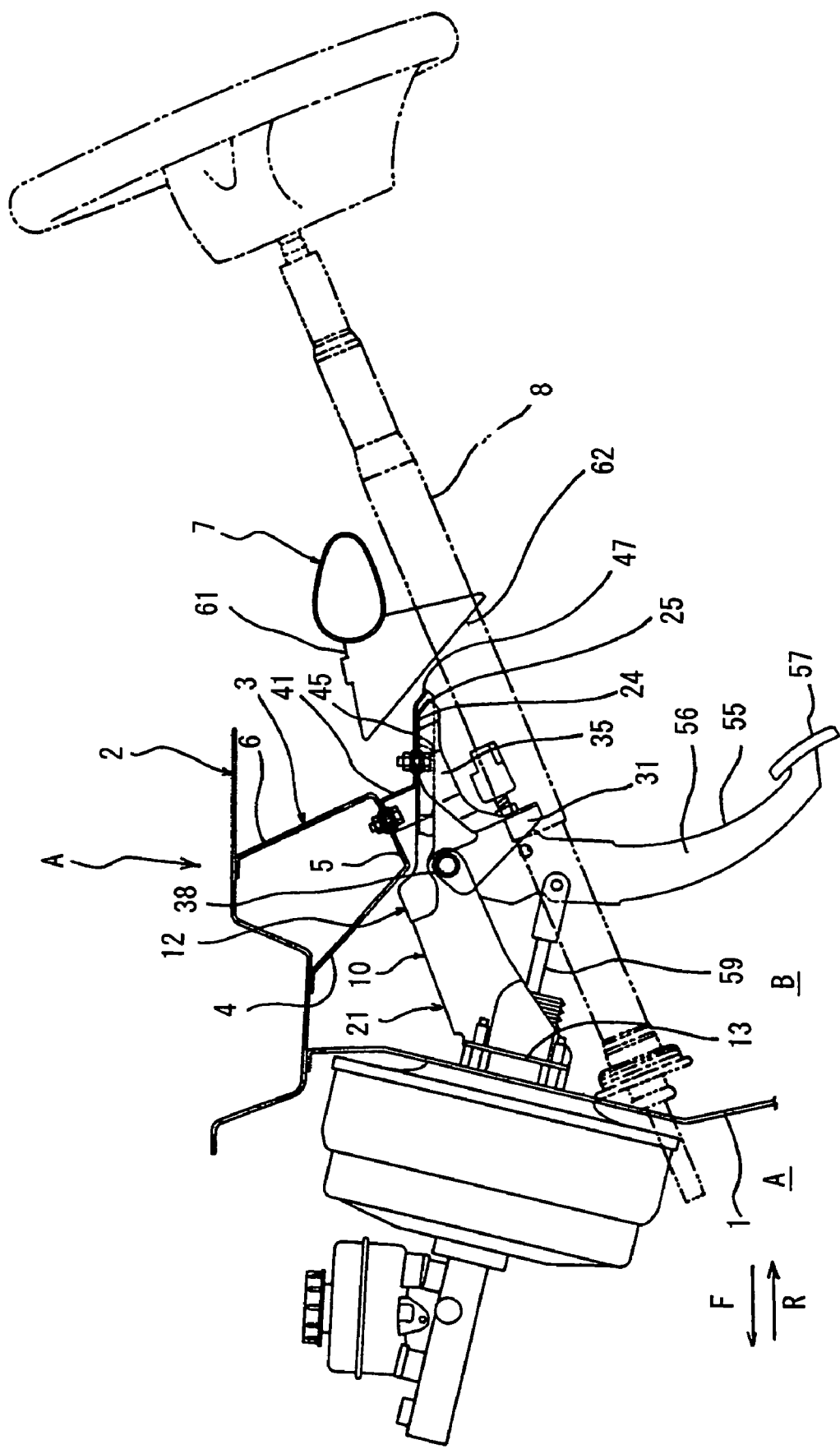
FIG. 1 is a schematic side view for explaining a pedal support structure of a brake pedal as an embodiment of the present invention.
Figure 2:
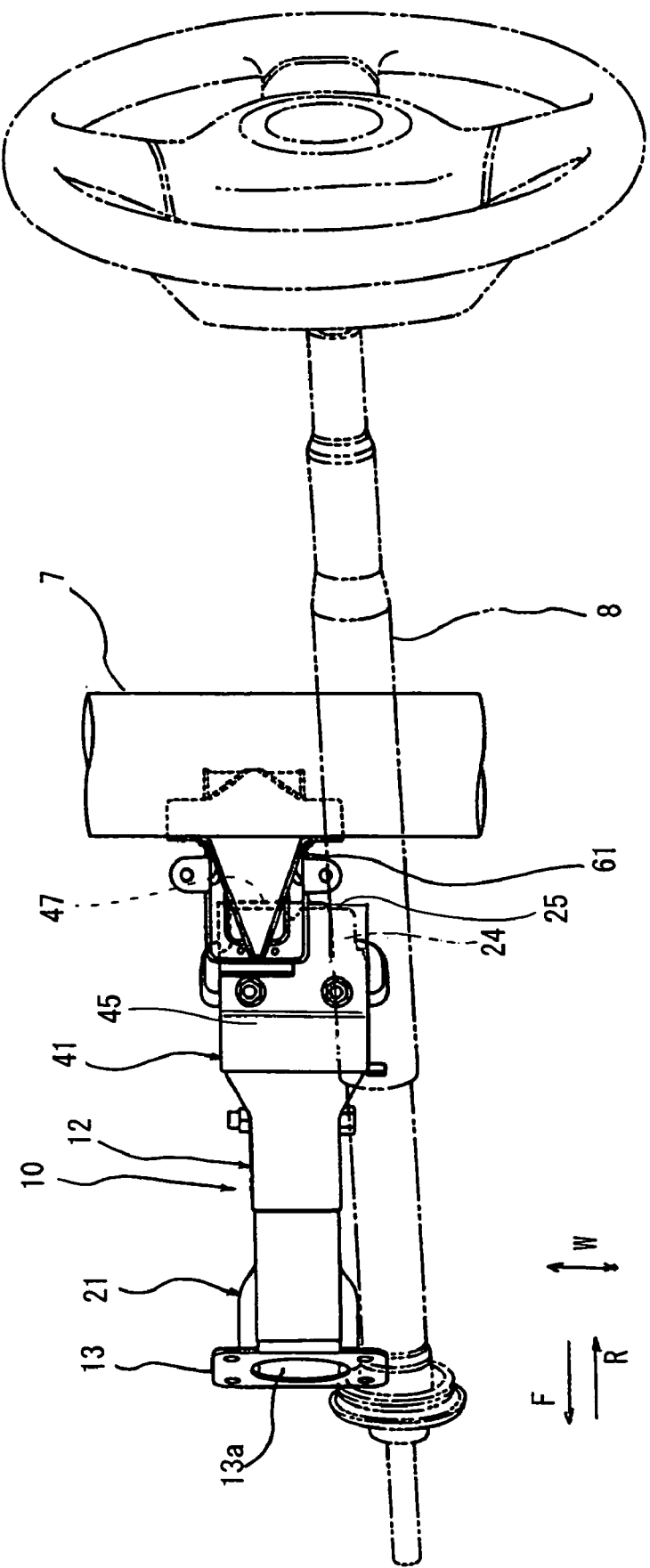
FIG. 2 is a plane view of a part of the pedal support structure shown in FIG. 1.
Figure 3:
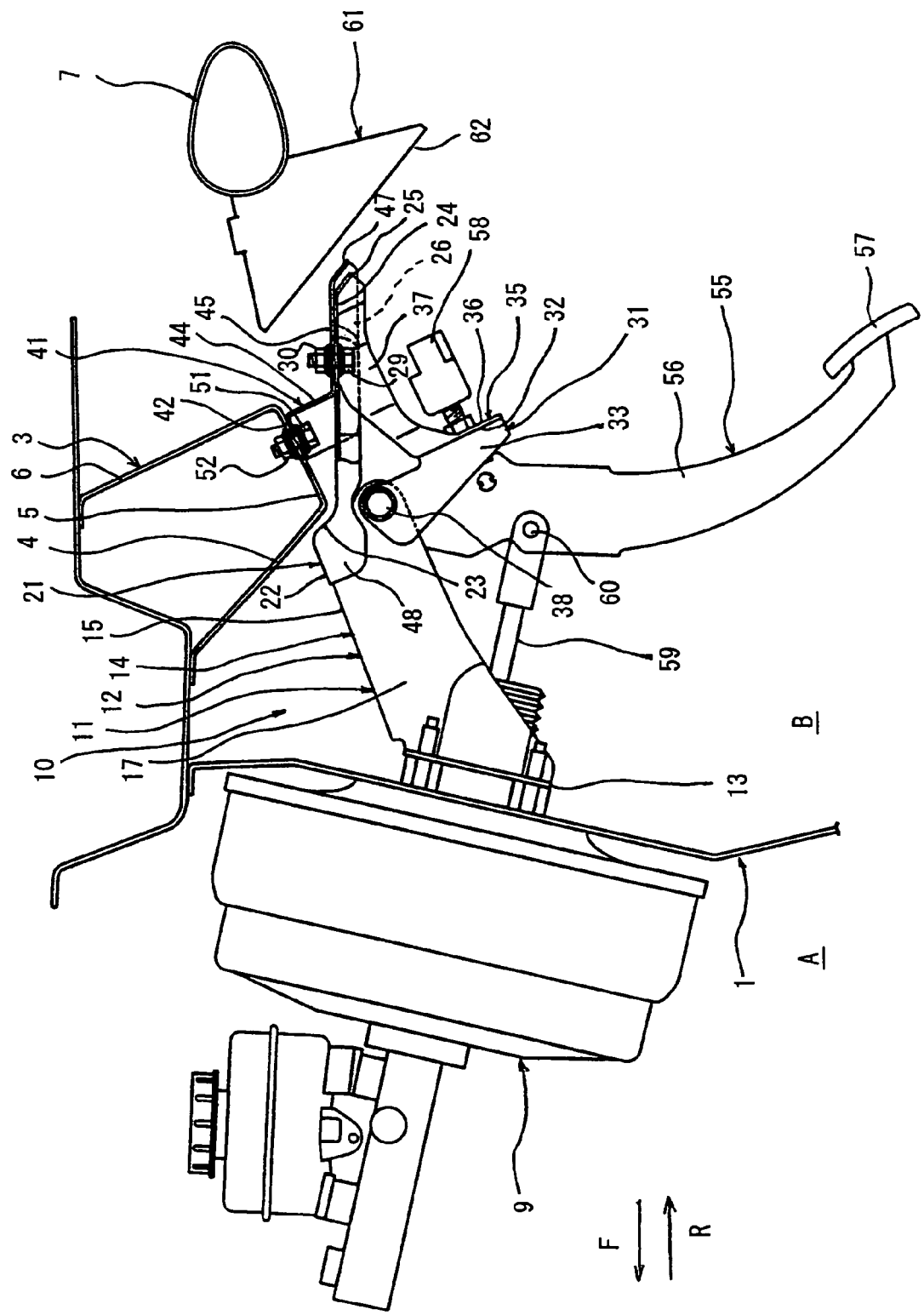
FIG. 3 is an enlarged view of a part of the pedal support structure shown in FIG. 1.
Figure 4:
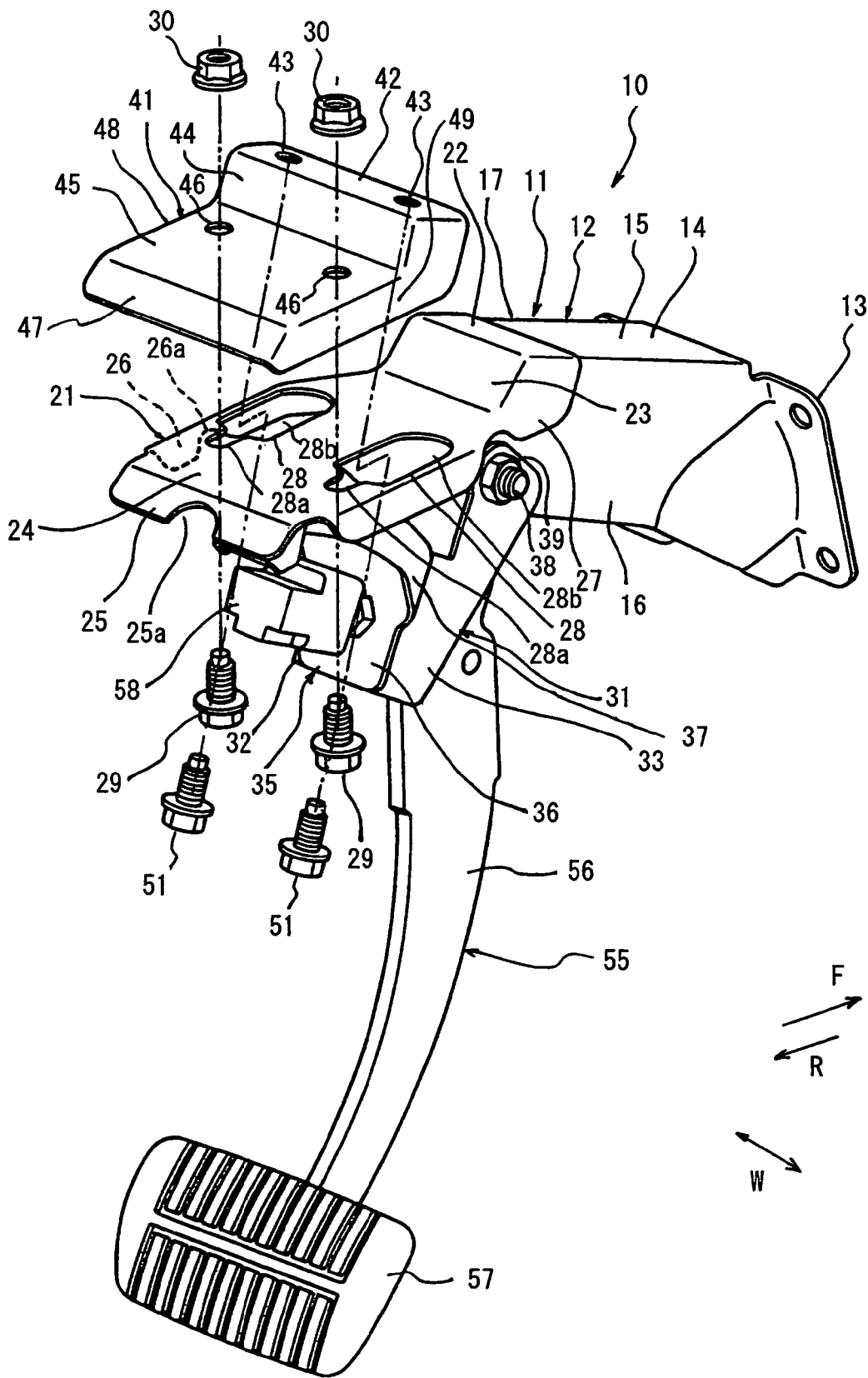
FIG. 4 is an exploded perspective view of a pedal support structure of the present invention.
Figure 5:
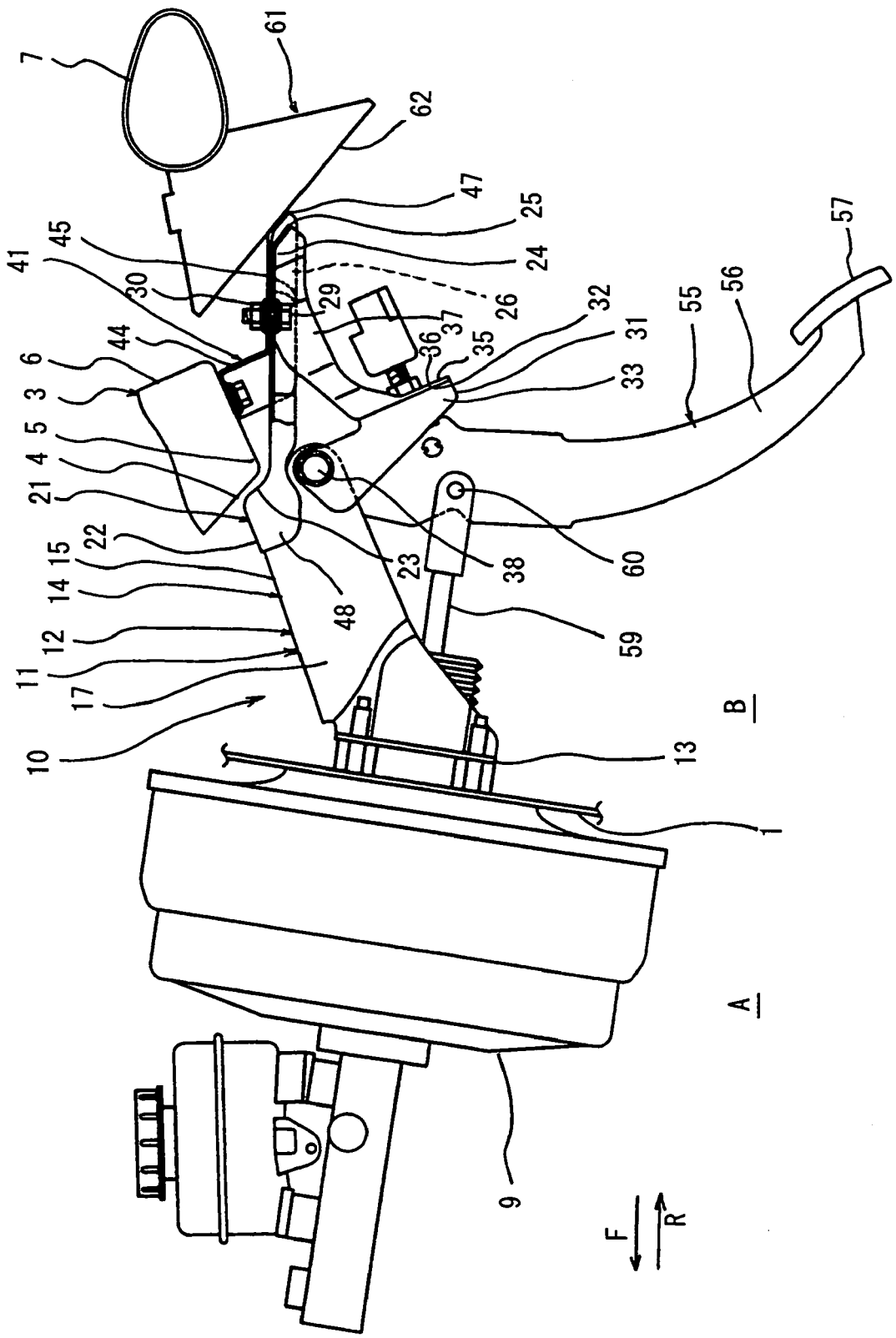
FIG. 5 is a side view of a pedal support structure of the present invention for explaining the function thereof.
Figure 6:
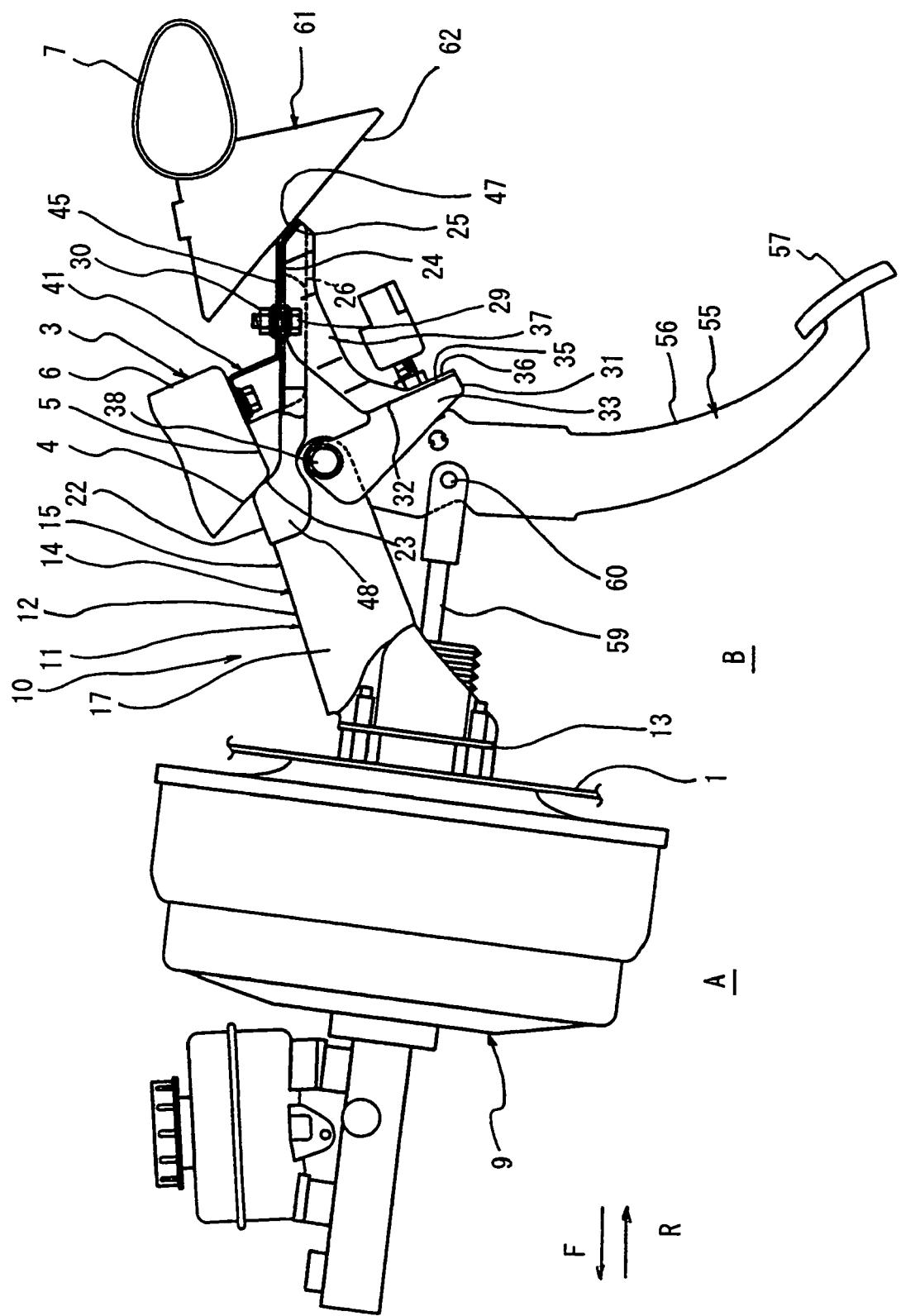
FIG. 6 is a side view of a pedal support structure of the present invention for explaining the function thereof.
Figure 7:
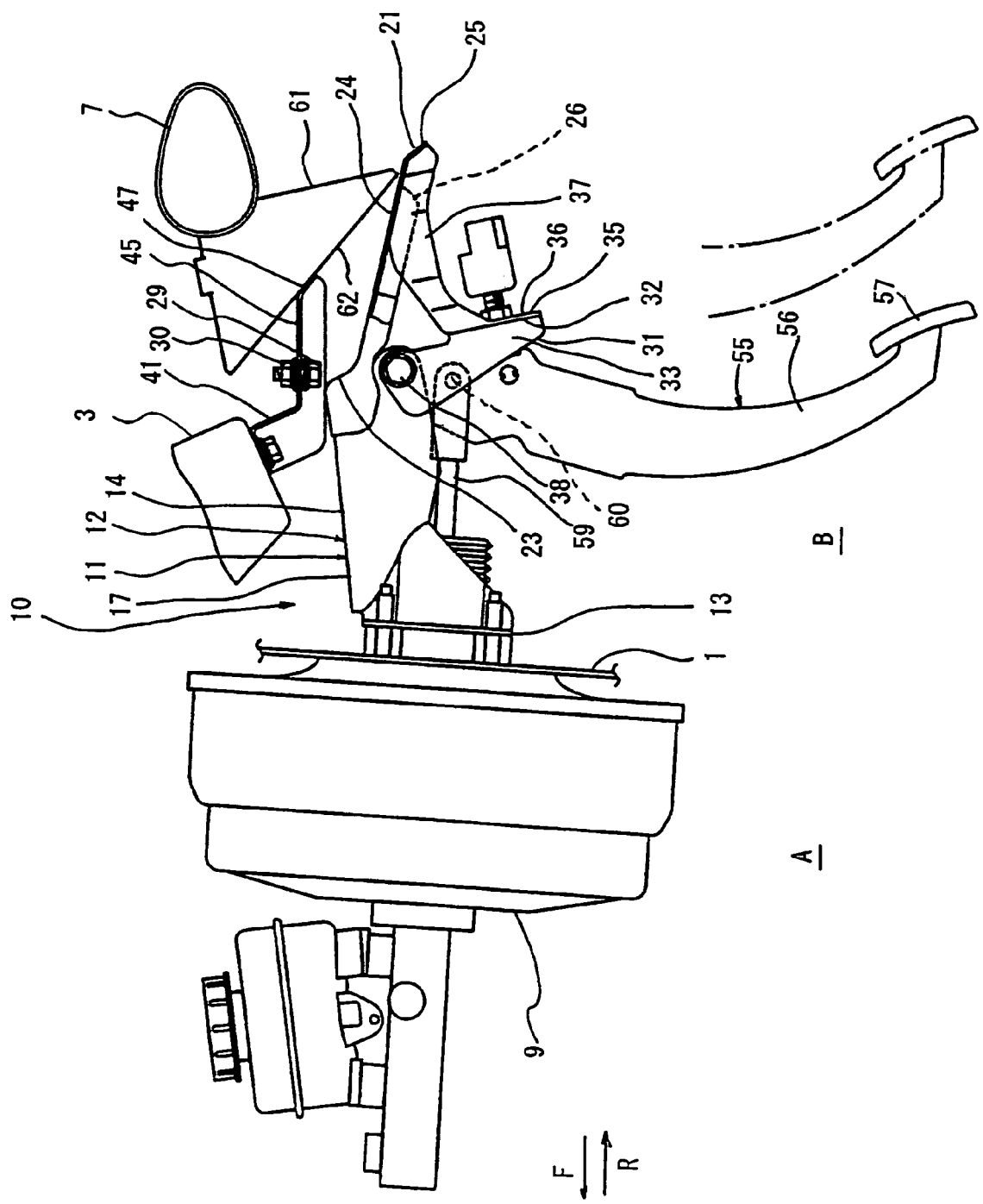
FIG. 7 is a partial side view of a pedal support structure of the present invention for explaining the function thereof.
Figure 8:
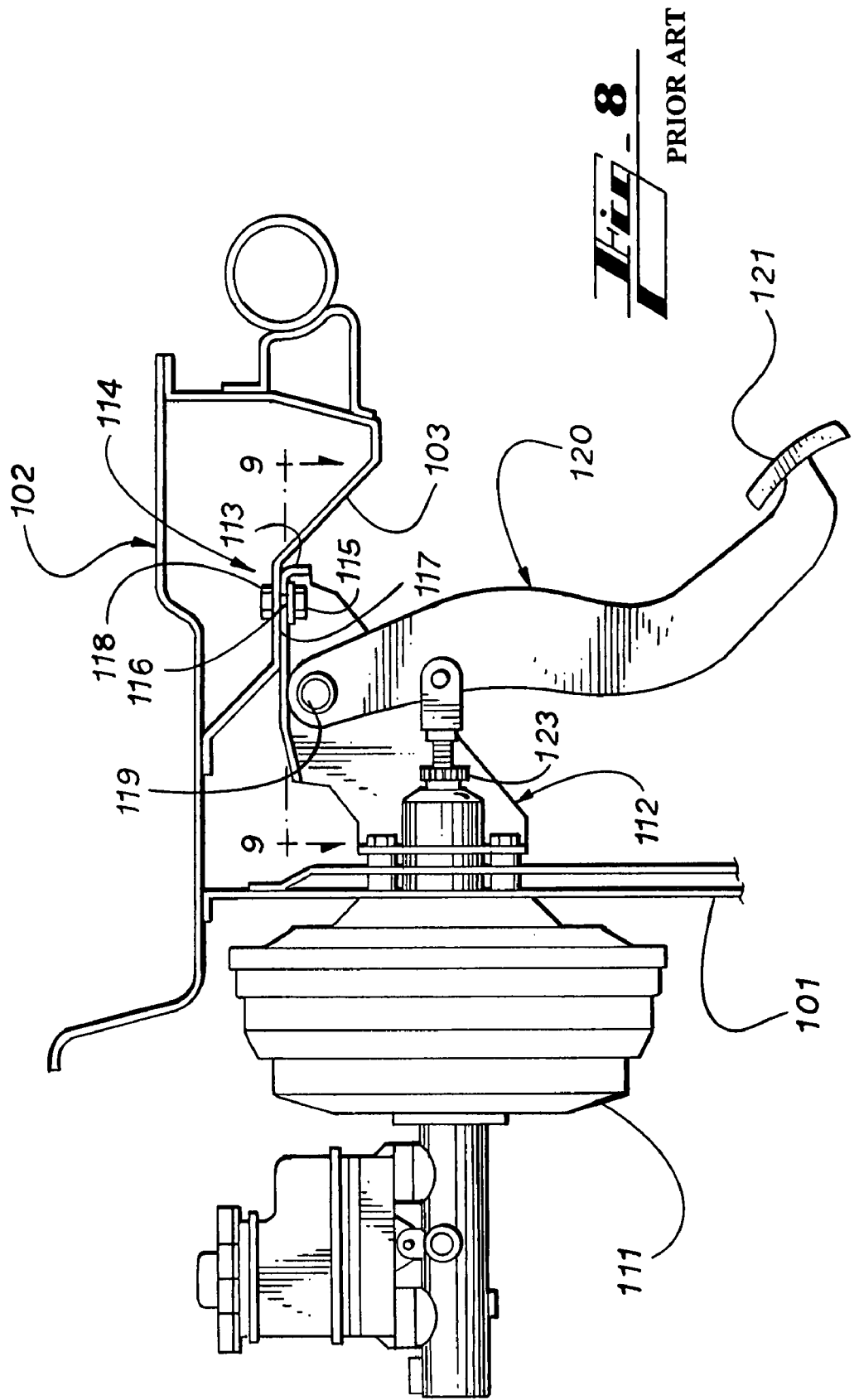
FIG. 8 is a schematic view of a conventional pedal support structure for explaining the structure.
Figure 9:
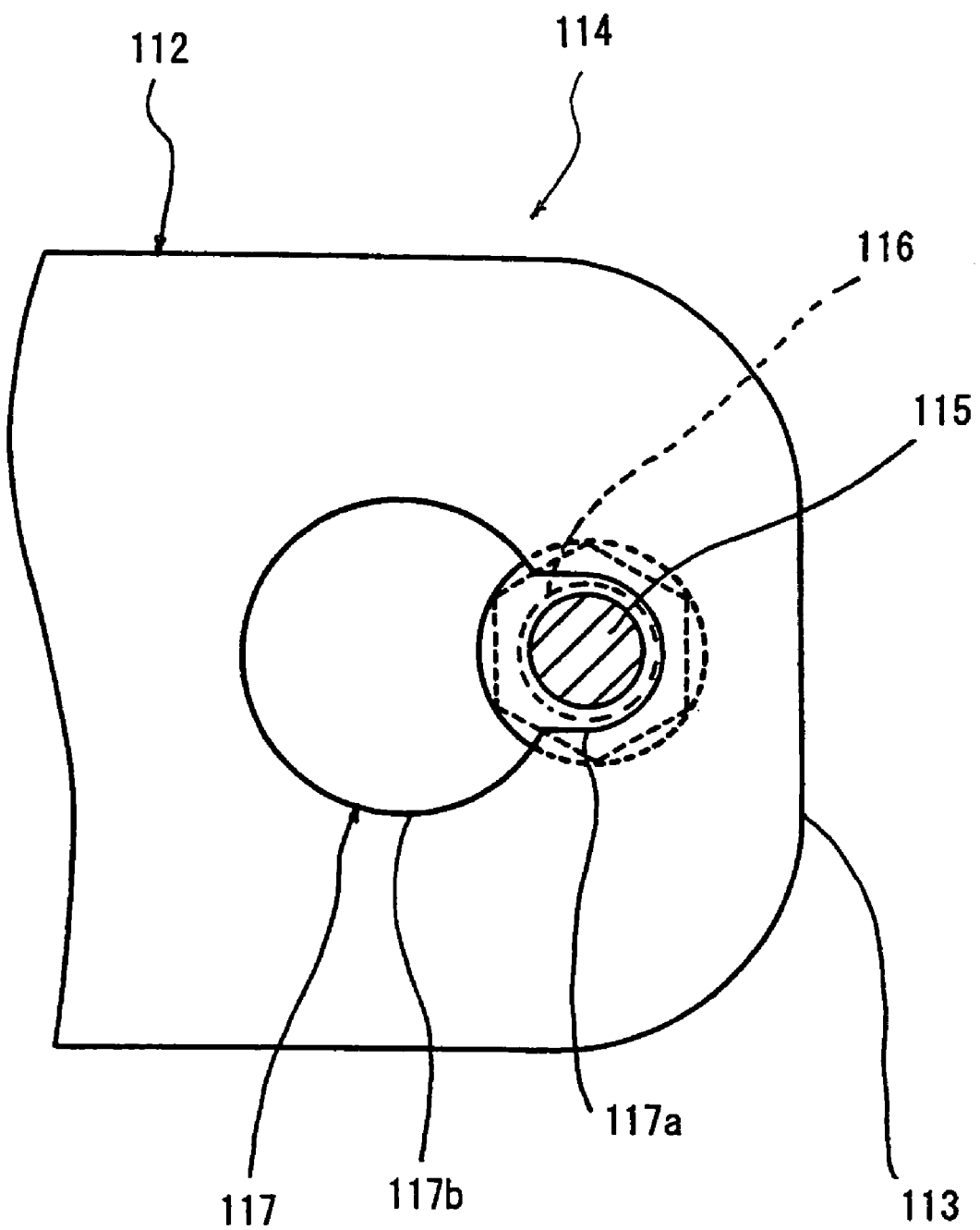
FIG. 9 is a cross section of a part shown in FIG. 8 cut along a line 9-9.

A pedal support structure for a vehicle of the present invention will be explained by referring to FIGS. 1 to 7 wherein a brake pedal for a vehicle is used as an example. FIG. 1 is a schematic side view for explaining a support structure for a brake pedal unit and related parts thereof. FIG. 2 is a plane view of a part of the pedal support structure shown in FIG. 1. FIG. 3 is an enlarged view of a part of the pedal support structure shown in FIG. 1. FIG. 4 is an exploded perspective view of a pedal support structure of the present invention. FIGS. 5 to 7 are side views of a pedal support structure of the present invention for explaining the function thereof. In the figures, arrows F, R and W indicate a front direction, a rear direction and a width direction of a vehicle, respectively.

As shown in FIG. 1, a reference numeral 1 indicates a toe board for partitioning an engine compartment A and a passenger compartment B. The toe board 1 extends approximately in a vertical direction between the engine compartment A and the passenger compartment B. Left and right lateral edges of the toe board 1 are connected to left and right front pillars (not shown). An upper edge and a lower edge of the toe board 1 are respectively connected to a bulkhead 2 and a floor panel (not shown). The bulkhead 2 extending in a widthwise direction of the vehicle is approximately horizontally provided so as to contact with the upper edge of the toe board 1. On a lower surface of the bulkhead 2, a pedal fixing bracket 3 is provided. The pedal fixing bracket 3 is successively composed of a front surface 4 which downwardly inclines toward a rear part of the vehicle, a lower surface 5, and a rear surface 6 with an upper end of the rear surface 6 connected to the bulkhead 2. The pedal fixing bracket 3 has a U-shape cross section having an upper open end attached to the bulkhead 2. Moreover, a support beam 7 having a cross section in the form of a ring extends in a widthwise direction of the vehicle. The support beam 7 is provided behind the pedal support bracket so as to bridge the left and right front pillars. The support beam 7 is a member having an extremely large rigidity which is sufficiently strong for supporting a steering column 8. On the support beam, a catcher 61 having a downwardly inclined surface 62 is provided. The inclined surface 62 has a downward inclination, namely the inclined surface 62 downwardly extends toward a rear side of the vehicle.

The toe board 1 has an opening which is not shown in the figure. A master cylinder 9 is provided on the toe board 1 at the side of an engine compartment A so as to correspond to the opening. A pedal bracket 10 for supporting a brake pedal 55 is provided on the toe board 1 at the side of the passenger compartment B so as to oppose the master cylinder 9.

The pedal bracket 10 will now be explained in detail by referring to FIGS. 1 to 4.

The pedal bracket 10 includes a pedal bracket main body 11, a stopper bracket 31 and a pedal bracket support part 41 as essential components (FIG. 4). A front part of the pedal bracket main body 11 and the master cylinder 9 are fastened to the toe board 1 by a bolt so as to have the toe board 1 therebetween (FIG. 3). The pedal bracket support part 41 connects the pedal bracket main body 11 to the pedal fixing bracket 3. The brake pedal 55 is supported on the pedal bracket main body 11.

As shown in FIG. 4, the pedal bracket main body 11 includes a front bracket member 12 and a rear bracket member 21 connected to a rear part of the front bracket member 12. The front bracket member 12 includes a front installation part 13 and a pedal support part 14 extending from the front installation part 13.

FIG. 2 shows that the front bracket member 12 includes the front installation part 13 approximately in the form of a rectangular plate with an opening 13a at the center of the rectangular plate. On the other hand, the pedal support part 14 has an upper surface 15 and lateral surfaces 16 and 17 downwardly extending from both lateral edges of the upper surface 15. Namely, the pedal support part 14 has a cross section in the form of a U shape made by the lateral surfaces 16 and 17 which opposes to each other and an open bottom end therebetween. The pedal support part 14 extends in a lengthwise direction of the vehicle with upwardly inclining toward a rear part of the vehicle. Pedal installation holes are perforated in the lateral surfaces 16 and 17 at rear parts thereof so as to oppose to each other.

As shown in FIG. 4, the rear bracket member 21 which extends in a lengthwise direction of the vehicle successively has a base part 22, an offset part 23, a connecting surface 24, and a rear end 25. The base part 22 is connected to a rear part of the front bracket member 12 to cover the upper surface 15 from the top. The offset part 23 downwardly extends by bending the base part 22 from a rear end. The offset part 23 is provided to have an inclination so as to oppose the front face 4 of the pedal fixing bracket 3. The connecting surface 24 in the form of a rectangular plate is formed approximately horizontally and extends rearwardly from a lower end of the offset part 23. The rear end 25 downwardly extends by bending from a rear end of the connecting surface 24. The rear end 25 opposes the inclined surface 62 of the catcher 61 attached to the support beam 7 (FIGS. 1 to 3). Flanges 26 and 27 are formed by downwardly extending from the lateral ends of the base parts 22, the offset part 23 and the connecting surface 24. The flange 26, which is provided close to the steering column 8, has a first notch 26a, and the rear end 25 also has a second notch 25a at a center part with respect to the vehicle width.

A pair of bolt holes 28 are formed side by side in a widthwise direction of the vehicle on the connecting surface 24. Each of the bolt holes 28 has a small diameter part 28a formed as a rear part of the hole 28 and a large diameter part 28b extending from the small diameter part 28a, as a front part of the hole 28. The diameter of the small diameter part 28a is determined so as that a shaft part of the bolt 29 can be inserted having a small space between the shaft part and a ridge of the small diameter part 28a. On the other hand, the diameter of the large diameter part 28b is determined so as that a head of the bolt 29 can pass through the large diameter part 28b.

The front bracket member 12 and the rear bracket member 21 were combined, thereby obtaining the pedal bracket main body 11. The pedal bracket main body 11 has a downwardly inclined front region and a horizontally extending rear region with a bend between the front region and the rear region. For combining the front and rear bracket members 12 and 21, a rear part of the upper surface 15 and rear parts of the lateral surfaces of the front bracket member 12 are superimposed on the base part 22 and the flanges 26 and 27 of the rear bracket member 21. Superimposed parts of the front and rear bracket members 12 and 21 are fixed by welding or the like.

The stopper bracket 31 has a pedal contacting portion 32 in the form of a rectangular plate and a pair of installation parts 33 which opposes to each other. The installation parts 33 are in the form of plates which vertically extend, and the pedal contacting portion 32 is attached to the installation parts 33 so as to bridge the bottom parts of the installation parts 33. Thus, the stopper bracket 31 has a U shape in a plane view. In upper portions of the installation parts 33, pedal installation holes (not shown) are provided. The upper portions of the installation parts 33 are superimposed on rear parts of the lateral surfaces 16 and 17. The pedal installation holes in the lateral surfaces 16 and 17 are adjusted to the pedal installation holes in the installation parts 33. The stopper bracket 31 is connected to the pedal bracket main body 11 through the pedal installation holes.

A reinforcement bracket 35 is provided on a pedal contacting portion 32 of the stopper bracket 31. The reinforcement bracket 35 includes a reinforcement member 36 for reinforcing the pedal contacting portion 32, and a connection part 37 extending from the pedal contacting portion reinforcement member 36. The reinforcement member 36 has the shape of a rectangular plate which is spread over the pedal contacting portion 32, and the connection part 37 has an elongated curved shape (FIG. 5). An end of the connection part 37 is connected to a back surface of the connecting surface 24 and the rear end 25, particularly at a part between the bolt hole 28 and the rear end 25 which is apart more from the steering column 8 than from the first and second notches 25a and 26a.

In other words, the pedal contacting portion 32 is reinforced by the reinforcement member 36, and the connection part 37 firmly connects the pedal contacting portion 32 and the pedal connecting surface 24. Therefore, an improved rigidity of the connecting surface 24 and the rear end 25 is obtained.

The brake pedal 55 is supported by the lateral surfaces 16 and 17 of the front bracket member 12, and a bolt 38 and a nut 39 provided on the stopper bracket 31. Here, the front bracket member 12 is reinforced by providing the stopper bracket 31 over the lateral surfaces 16 and 17. Moreover, the bolt 38 and the nut 39 are used as a pedal support member. The bolts 38 are inserted in the pedal installation holes provided in both the lateral surfaces 16 and 17 and the installation parts 33. The brake pedal 55 has a vertically extending pedal lever 56 and a pedal pad 57 provided at the lower end of the pedal lever 56. The upper end of the brake pedal 55 is supported by the bolt 38 so as to perform pivotal movement. A return spring (not shown) is wound around the bolt 38, whereby the brake pedal 55 is urged in an opposing direction with respect to the stamping force of a passenger.

A stop lamp switch 58 is provided on the pedal contacting part 32 of the stopper bracket 31. The stop lamp switch 58 makes a stop lamp turned on when a stopper member provided on the pedal lever 56 is detached from the switch 58 by depressing the pedal pad 57.

The pedal bracket support part 41 successively includes a base part 42, an offset part (step portion) 44, a supporting surface 45 and a rear end 47. The base part 42 is connected to the afore-mentioned lower surface 5 of the pedal fixing bracket 3 (FIG. 1) by fastening by bolts 51 inserted in bolt holes 43 provided in the base part 42. The offset part 44 extends from the rear end of the base part 42 by bending in a downward direction. The supporting surface 45 in the form of a rectangular plate horizontally extends by bending the offset part 44 from the lower end thereof. The rear end 47 downwardly extends from a rear end of the supporting surface 45. The rear end 47 having downward inclination opposes the inclined surface 62 of the catcher 61 attached to the support beam 7. The supporting surface 45 has a pair of bolt holes 46 therein which are arranged side by side in a widthwise direction of the vehicle. The bolt holes 46 are formed so as to correspond to the small diameter part 28a of the bolt holes 28 formed in the connecting surface 24 of the rear bracket member 21.

A connecting member is formed by the connecting surface 24 having the bolt holes 28, the supporting surface 45 having the bolt holes 46, bolts 29 which are inserted in the bolt holes 28 and 46, and nuts 30 into which the bolts 29 are screwed.

Furthermore, a flange 48 extends downwardly by being bent at a lateral end of the base part 42, the offset part 44 and the supporting surface 45. The offset part 44 is formed on the side which is closer to the steering column 8. The flange 48 extends to a part in the vicinity of the previously mentioned notch 26a formed in the flange 26 of the rear bracket member 21. On the other lateral side of the pedal support part 41, i.e., on the side which is apart from the steering column 8, a flange 49 is formed. The flange 49 downwardly extends along the base part 42, the offset part 44 and the supporting surface 45 by being downwardly bent at a lateral end of these. The flange 49 is formed to be integral with the rear end 47.

The supporting surface 45 and the flanges 48 and 49 constitute a guide member. The guide member guides the rear end 25 of the rear bracket member 21 toward a downwardly inclined surface 62 of the catcher 61 when the rear bracket member 21 moves rearwardly by applying an external force to a front part of the vehicle.

The connecting surface 24 and the rear end 25 of the rear bracket member 21 and the supporting surface 45 and the rear end 47 of the bracket support part 41 are symmetrically provided based on a centerline of the pedal 55 with respect to a widthwise direction of the vehicle.

When the pedal bracket 10 is mounted on a vehicle body, the brake pedal 55 and the stop lamp switch 58 are previously attached to the pedal bracket 10. Furthermore, the supporting surface 45 of the pedal bracket support part 41 is superimposed on the connecting surface 24 of the rear bracket member 21 from the top. For the superimposition, the small diameter parts 28a of the bolt holes 28 in the rear bracket member 21 are adjusted to the bolt holes 46 in the pedal bracket support. Furthermore, the flanges 26 and 27 are placed between the flanges 48 and 49 and respectively oppose thereto. In the above-mentioned arrangement, the rear bracket member 21 and the pedal bracket support member 41 are combined by the bolts.

When the positions of the small diameter ports 28a of the bolt holes 28 and the bolt holes 46 are determined, the rear end 47 of the pedal bracket support part 41 is spaced apart from the rear end 25 of the rear bracket member 21. A back surface of the rear ends 41 and the rear end 25 opposes each other and are spaced apart from each other. The rear end 47 further projects rearwardly in comparison to the rear end 25.

Thereafter, the connecting surface 24 and the supporting surface 45 are connected to each other by the connecting member including the small diameter parts 28a of the bolt holes 28, and the bolts 29 which pass thorough the bolt holes 45 and the nuts 30. The bolts 29 and the nuts 30 are fastened by a fastening force by which the rear bracket member 21 rearwardly slides with respect to the pedal bracket support member 41 when a load is applied to the rear bracket member 21. The rear bracket member 21 receives the load when the rear end 47 of the support member 41 contacts with the inclined surface 62 of the catcher 61 provided on the support beam 7.

The connection of the rear bracket member 21 with the pedal bracket support part 41 is carried out before mounting on a vehicle body. Excellent working performance is attained when the connecting operation is performed in an open space. Outside the passenger compartment, the small diameter parts 28a of the bolt holes 28 are adjusted to the bolt holes 46, and the rear bracket member 2 and the pedal bracket support part 41 provided in corresponding positions are fixed by using the bolts 29 and the nuts 30, in advance. The excellent working performance makes it possible to accurately connect the pedal bracket support part 41 to the rear bracket member 21. Furthermore, the assembly in an open space makes it possible to readily fasten the pedal bracket support part 41 and the rear bracket member 21 by an appropriate fastening force. Consequently, the assembly of the pedal bracket main body 11 can be conducted reliably. The assembling accuracy affects the movement of the pedal bracket 10 and the pedal 55 when a frontal collision occurs.

To the thus prepared pedal bracket 10, the brake pedal 55 and the pedal bracket support part 41 are attached. The front installation part 13 formed in front of the pedal bracket main body 11 and the master cylinder 9 are fastened to the toe board 1 by a bolt. On the other hand, the pedal bracket main body 11 is connected to the bulkhead 2 via the pedal fixing bracket 3 by bolts 51 screwed into welding nuts 52 (FIGS. 3). The welding nuts 52 are provided on the lower surface 5 of the pedal fixing bracket 3 in advance. The bolts 51 are inserted in the large diameter parts 28b of the bolt holes 28 in the pedal bracket support part 41 and the bolt holes on the pedal bracket support part 41 and connected to the welding nuts 52. Thus, the pedal bracket 10 is connected to the bulkhead 2. A pushrod 59 projects from the master cylinder 9 and extends thought the toe board 1. A rear end of the pushrod 59 is connected to an intermediate part of the pedal lever 56 by a clevis pin 60 so as to pivotably support the pedal lever 56.

In accordance with the above-mentioned mounting operation, a front end of the pedal bracket main body 11 is fixed to the toe board 1, and a rear part is fixed to the pedal fixing bracket 3. For this operation, it is not necessary to determine the fixing position within a limited space. The bolt holes 28 can be used as holes for the mounting operation, as mentioned previously, so that is not necessary to perforate other holes of the mounting operation. Accordingly, the rear bracket main body 21 with a simple structure is obtained which has an improved rigidity.

The thus structured brake pedal device is mounted on a vehicle body as shown in FIGS. 1 to 3. Namely, the front end of the pedal bracket main body 11 is connected to the toe board 1, and a rear part thereof is connected to the bulkhead 2 so as to maintain sufficient installation rigidity. As mentioned previously, the rear end 47 of the pedal bracket support part 41 opposes to the inclined surface 62 of the catcher 61 attached to the support beam 7, having a space between the rear end 47 and the inclined surface 62.

The brake pedal 55 is maintained in a predetermined position, with the stopper on a pedal lever 56 being pressed to the stop switch 58 usually by a return spring. The stop switch 58 is provided on the pedal contacting portion 32 of the stopper bracket 31.

When a passenger stamps a pedal pad 57, breaking operation is carried out. The stamping force causes the pedal lever 56 to rotate on the bolt 38 toward a front direction opposing the urging force of the return spring. The pedal lever 56 presses the pushrod 59, and the pressing force is conveyed to the master cylinder 9. The master cylinder 9 amplifies the stamping force, and the amplified force causes a brake device to actuate. When the pedal lever 56 moves forward, the stopper member is detached from the stop lamp switch 58. Therefore, the stop lamp switch 58 is turned on and hence the stop lamp is turned on.

When the stamping force applied to the pedal pad 57 is released, the urging force by the return spring causes the pedal lever 56 to rotate about the bolt 38 in a rearward direction. The stopper member contacts with the stop lamp switch 58 again.

Finally, the pressure applied to the pushrod 59 is released, whereby the braking operation is suspended.

When an external force, greater than a predetermined force is applied to the front of the vehicle, the external force pushes a power unit backward, and the power unit pushes the master cylinder 9 and the toe board 1 toward the passenger compartment. Finally, the brake pedal supported by the pedal bracket is pushed backward. In this case, a normal state as shown in FIGS. 1 to 3 is changed to a state shown in FIG. 5. The rearward movement of the toe board 1 and other members causes the deformation of a part of the pedal support part 14, which has a relatively low rigidity because of the U shape. Here, the pedal bracket 3 is deformed, and the pedal bracket main body 11 and the brake pedal 55 move rearwardly in a stable condition, i.e., without substantially changing the original shape. The rear end 45 of the pedal bracket support part 41 contacts with the inclined surface 62 of the catcher 61. Namely, the catcher 61 receives the rear end 45.

In the situation where the rear end 46 is in contact with the inclined surface 62, the pedal bracket support part 41 is supported by both the pedal fixing bracket 3 and the catcher 61. If the master cylinder 9 and the toe board 1 further move rearwardly, the connecting surface 24 of the rear bracket member 21 slides rearwardly by the guidance along the supporting surface 45 of the pedal bracket support part 41. Then, the rear end 25 of the rear bracket member 21 contacts the inclined surface 62 through the rear end 47 of the pedal bracket support part 41. The rearward movement of the rear bracket member 21 is stably conducted by the above-mentioned structure.

The pedal support structure of the present invention helps the stable rearward movement by the use of the following structures: Firstly, the connection of the rear bracket member 21 and the pedal bracket support part 41 is maintained by the provision of the bolts 29 inserted in the small diameter parts 28a formed in the connecting surface 24 and the bolt holes 43 in the supporting surface and the nut 30. Secondly, the flanges 26 and 27 of the rear bracket member 21 are guided along the flanges 48 and 49 by the pedal bracket support part 41. Finally, the connecting surface 24 and the supporting surface 45 are approximately in the form of flat plates and extend in a lengthwise direction of the vehicle, which approximately correspondingly to the direction of the rearward movement of the pedal bracket main body 11. Thus, it is possible to exclude complicated rearward movement of the rear bracket member 21.

When the master cylinder 9 and the toe board 1 move rearwardly and hence the rear bracket member 21 moves rearwardly, the offset part 23 of the rear bracket member 21 contacts with the front surface 4 of the pedal fixing bracket 3 which has a downward inclination, as shown in FIG. 6. After the contact of the two inclined surfaces, i.e., the contact between the offset part 23 and the front surface 4, the rear bracket member 21 receives a pressing down force.

In the state where the rear bracket member 21 is pushed down by the above-mentioned contact between the offset part 23 and the front surface 4, the pedal bracket main body 11 can further moves rearwardly. By the rearward movement, the connecting surface 24 of the rear bracket member 21 moves rearwardly with respect to the pedal bracket support part 41 connected to the pedal fixing bracket 3. In this case, the bolts 29 on the small diameter parts 28a slide to the large diameter parts 28b in the connecting surface 24. At this stage, the bolts 29 no longer support the connecting plate 24. Accordingly, the connection by the bolt 29 is loosened and the rear bracket member 21 is detached from the pedal bracket support part 41. The detachment of the rear bracket member 21 from the pedal bracket support part 41 is positively performed since the bolts 29 slip out of the small diameter part 28a and brought to the large diameter part 28b under the state where the pedal bracket main body 21 is pushed down as mentioned previously.

The rear end 25 of the rear bracket member 21 which has been detached from the pedal bracket support part 41 is pressed down along the rear end 47 of the pedal bracket fixing part 41 and the inclined surface 62 of the catcher 61, as shown in FIG. 7. When the rear ends 25 and 47 downwardly slide, the pedal moves forwardly. FIG. 7 shows the original position of the pedal 56 drawn by an imaginary line, and the forwardly moved position thereof by a solid line.

When the rear bracket main body 21 is pushed down by the provision of the rear end 47 of the pedal bracket support part 41 and the inclined surface 62 of the catcher 61, it is necessary that the connecting surface 24 have a sufficient rigidity. Such rigidity of the connecting surface 24 is maintained in the present invention by the connection part 37 which is provided so as to bridge the pedal contacting portion 32 of the stopper bracket 31 and the connecting surface 24. Furthermore, the load applied by the rearward movement of the toe board 1 is effectively transmitted to the rear end 25 via the pedal bracket main body 11.

As mentioned previously, the rear end 25 of the pedal bracket main body 11 and the rear end 47 of the pedal bracket support part 41 are inclined downwardly toward a rear part of the vehicle. Therefore, the rear end 25 is smoothly introduced in a downward direction by being guided along the rear end 47 of the pedal bracket part 41 and the inclined surface 62 of the catcher 61. As a result, the rear end 25 of the pedal bracket main body 11 is certainly pushed down.

It is preferable that the rear end 25 of the pedal bracket main body 11 and the rear end 47 of the pedal bracket support part 41 are provided symmetrically based on a center line of the pedal 55 with respect to the vehicle width. In this case, the rear end 25 of the pedal bracket main body 11 can be downwardly guided along the inclined surface 62 of the catcher 61 in a stable condition and the swing of the pedal 55 in a widthwise direction of the vehicle is restricted.

As a result of the above movement, the brake pedal 55 supported on the pedal bracket main body 11 makes pivotal movement in a forward direction. In other words, the pedal pad 57 provided on the bottom end of the pedal lever 56 moves forwardly with respect to a lengthwise direction of the vehicle. Thus, the pedal lever 55 and the pedal pad 57 forwardly rotate so as to set off the above-mentioned rearward movement when the master cylinder 9 and the pedal bracket main body 11 rearwardly move by collision from the front. Therefore, it is possible to prevent a passenger from application of load to his or her foot placed on the pedal pad 57 of the brake pedal 55 by collision. Moreover, it is possible to prevent the passenger from the interference of the brake pad 57 with his or her leg.

Preferably, the connecting surface 24 of the pedal bracket main body 11 and supporting surface 45 of the pedal bracket support part 41 are symmetrically provided on the centerline of the pedal with respect to the vehicle width. In the symmetrical arrangement, the center axis of the moving force of the pedal bracket main body 11 corresponds to the centerline of the repulsive force from the pedal 55 when viewed from the top. Therefore, the swing of the pedal bracket main body 11 and the pedal 55 in a direction of the vehicle width is restricted. Thus, the pedal bracket main body 11 and the pedal 55 behave in a stable condition.

Moreover, the rear end 25 of the pedal bracket main body 11 is effectively guided in a downward direction by sliding on the inclined surface 62 of the catcher 61, by providing the connecting surface 24 of the bracket main body 11 and the supporting surface 45 of the pedal bracket support part 41 on a rear side with respect to a part where the pedal fixing bracket 3 is connected with the pedal bracket support part 41.

As mentioned previously (FIG. 4), the first and second notches 25a and 26a are respectively provided on the rear end 25 and the flange 26. The first notch 25a is formed at a center part of the flange 25 with respect to the vehicle width. An end of the connection part 37 of the reinforcement bracket 35 is connected to the lower surface of the connecting surface 24 at a part which is further apart from the steering column 8 than from the first and second notches 25a and 26a. The rear end 25 and the flange 26 with notches 25a and 26a are relatively weak, and hence the rear end 25 and the flange 26 are partially deformed at the side of the steering column 8 when the column 8 or other peripheral members are in contact therewith. Accordingly, it is possible to minimize adverse effects to the steering column 8 or other peripheral members.

As is explained, it is possible that an external force exceeding a predetermined value is applied to the front of the vehicle. In that case, the power unit or other member around the power unit is moved rearwardly. The rearward movement of the power unit or the like pushes the master cylinder 9 or the toe board 1 toward a passenger compartment. When the pedal bracket main body 11 for supporting the brake pedal 55 is moved rearwardly, the rear end 47 of the pedal bracket support part 41 come into contact with the inclined surface 62 of the catcher 61. The pedal fixing bracket 3 and the catcher 61 support the pedal bracket support part 41. The pedal bracket main body 11 moves rearwardly by the guidance of the thus supported pedal bracket support part 41 in a stable condition. Moreover, the rear end 25 of the rear bracket member 21 can be effectively pushed down along the inclined surface 62 of the catcher 61. Therefore, it is possible that the brake pedal 55 is positively rotated in a forward direction, whereby a possible load application to a foot can be eliminated or decreased.

Furthermore, it is possible to easily control a behavior of the pedal bracket 10 and the brake pedal 55 by an experiment or a simulation since the pedal bracket main body 11 for use in the present invention moves in a stable condition at the time of a collision. Therefore, it is possible to appropriately tune the pedal bracket 10 and the brake pedal 55 based on estimated movement of these parts. Consequently, desirable effect, especially safety of the passenger can be maximally obtained.

Differently from the above embodiment, it is also possible to perforate bolt holes 28 which extends in a lengthwise direction of the vehicle, successively containing a small diameter part 28a and a large diameter part 28b connected to the small diameter part 28a. The small diameter part 28a is formed so as to have a diameter through which a shaft part of the bolt 29 is movable and a head thereof cannot pass. The large diameter part 28b is formed to have a diameter through which the head of the bolt can pass when the rear part 25 of the pedal bracket main body 11 is in contact with the inclined surface 62 of the catcher 61. On the other hand, it is possible to form bolt holes 46 in the connecting surface 24 with a diameter through which the shaft part of the bolts 29 can be inserted.

Furthermore, it is possible to use a pair of bolt and nut and corresponding number of bolt holes, and to use three or more pairs of bolts and nuts and corresponding number of holes, instead of using two pairs of bolts 29 and nuts 30 as shown in the figure.

The pedal support structure of a brake pedal in the above embodiment can adapt to the clutch pedal support structure.

Other structures and functions that may be disclosed in Japanese Patent Application 2003-143675, filed on May 21, 2003 are hereby incorporated by reference into this application.

The present invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

What is claimed is:

1. A pedal support structure for a vehicle comprising:
 a toe board;
 a catcher having a downwardly inclined surface facing said toe board and inclining in a rearward direction of the vehicle;
 a pedal bracket connected to said toe board and extending in a lengthwise direction of the vehicle; and
 a pedal including a pedal lever supported on said pedal bracket; said pedal bracket including:
 a pedal bracket main body supporting said pedal lever and extending in a lengthwise direction of the vehicle, a front end of said pedal bracket main body connected to said toe board, a rear end of said pedal bracket main body opposing said downwardly inclined surface of said catcher, and said rear end being spaced apart from said downwardly inclined surface; and
 a guide member guiding the rear end of said pedal bracket main body toward said downwardly inclined surface of said catcher when an external force is applied from a front part of the vehicle to said toe board so that the rear end of said pedal bracket main body slides downwardly along said downwardly inclined surface of said catcher when the rear end of said pedal bracket main body moves further rearward, wherein said guide member is different from said catcher; and said pedal support structure further comprising:
 a bulkhead and a pedal bracket support part supported on said bulkhead, said pedal bracket support part having a supporting surface and flanges formed on lateral sides of said supporting surface so as to extend in the lengthwise direction of the vehicle, said supporting surface and said flanges constituting said guide member, said pedal bracket main body having a connecting surface, said supporting surface being superimposed on top of said connecting surface.

2. The pedal support structure for the vehicle as claimed in claim 1, further comprising a support beam extending in a widthwise direction of the vehicle, and wherein said catcher is supported on said support beam and said guide member is supported by said bulkhead.

3. The pedal support structure for the vehicle as claimed in claim 1, wherein:
 the rear end of said pedal bracket main body opposes said downwardly inclined surface of said catcher in a lengthwise direction with respect to the vehicle, and said rear end is spaced apart from said downwardly inclined surface in a lengthwise direction with respect to the vehicle.

4. The pedal support structure for the vehicle as claimed in claim 1 wherein said downwardly inclined surface is positioned rearward of the rear end of said pedal bracket main body.

5. A pedal support structure for a vehicle comprising:
 a toe board;
 a bulkhead;
 a catcher having a downwardly inclined surface facing said toe board and inclining in a rearward direction of the vehicle;
 a pedal bracket provided between said toe board and said catcher, and extending in a lengthwise direction of the vehicle; and
 a pedal including a pedal lever supported on said pedal bracket via a shaft; said pedal bracket including:
 a pedal bracket main body supporting said pedal lever and extending in a lengthwise direction of the vehicle, said pedal bracket having a main body front end, a connecting surface and a main body rear end extending from said connecting surface, said main body front end being connected to said toe board, said main body rear end opposing said downwardly inclined surface of said catcher and being spaced apart from said downwardly inclined surface;
 a pedal bracket support part supported on said bulkhead and including a supporting surface and a support part rear end extending from said supporting surface, said supporting surface contacting said connecting surface of said pedal bracket main body, said supporting surface provided on the top of said connecting surface, said support part rear end protruding in a rearward direction of the vehicle with respect to the main body rear end, a back surface of said support part rear end being spaced apart from said main body rear end; and
 a connecting member slidably connecting said supporting surface and said connecting surface with each other to provide a connection between said supporting surface and said connecting surface; said connecting member permitting said pedal bracket main body to slide with respect to said pedal bracket support part when an external load is applied to said toe board from a front part of the vehicle, said pedal bracket main body sliding rearwardly with respect to said pedal bracket support part when the support part rear end is in contact with said downwardly inclined surface of said catcher, and the connection between said supporting surface being released and said main body rear end being downwardly guided along said downwardly inclined surface of said catcher when said main body rear end contacts said downwardly inclined surface.

6. The pedal support structure for the vehicle as claimed in claim 5, further comprising:
 a pedal fixing bracket provided on said bulkhead, said pedal bracket main body being supported on said bulkhead by said pedal fixing bracket.

7. The pedal support structure for the vehicle as claimed in claim 6, wherein:
 said pedal bracket main body further comprises an offset part extending upwardly from a front edge of said connecting surface, said pedal bracket main body opposing a front surface of said pedal fixing bracket, the pedal bracket main body being pressed downwardly when said offset part contacts said front surface of said pedal fixing bracket and said pedal bracket main body moves rearwardly with respect to the vehicle.

8. The pedal support structure for the vehicle as claimed in claim 5, wherein:
 said connecting surface of said pedal bracket main body includes main body flanges on lateral ends of said connecting surface, said main body flanges extending in a lengthwise direction with respect to the vehicle, and said supporting surface of said pedal bracket support part including supporting flanges on lateral ends thereof, said main body flanges respectively opposing said supporting flanges.

9. The pedal support structure for the vehicle as claimed in claim 5, wherein:
said connecting member comprises a bolt, said supporting surface, said connecting surface and a nut, said bolt having a shaft part and a bolt head, said supporting surface having a supporting surface bolt hole perforated therein, said connecting surface having a connecting surface bolt hole perforated therein, said bolt being screwed into said nut by passing through said supporting surface bolt hole and said connecting surface bolt hole, said supporting surface bolt hole including a small diameter part and a large diameter part extending from the small diameter part, said small diameter part having a diameter such that the shaft part can be inserted therein and the bolt head cannot pass therethrough, said large diameter part having a diameter such that the bolt head can pass therethrough, said connecting surface bolt hole having such a diameter that the shaft part can be inserted therein.

10. The pedal support structure for the vehicle as claimed in claim 5, wherein:
said connecting member comprises a bolt, said supporting surface, said connecting surface and a nut, said bolt having a shaft part and a bolt head, said supporting surface having a supporting surface bolt hole perforated therein, said connecting surface having a connecting surface bolt hole perforated therein, said bolt being screwed into said nut by passing through said supporting surface bolt hole and said connecting surface bolt hole, said supporting surface bolt hole having such a diameter that the shaft part can be inserted therein, said connecting surface bolt hole including a small diameter part and a large diameter part extending from the small diameter part, said small diameter part having such a diameter that the shaft part can be inserted therein and the bolt head cannot pass therethrough, said large diameter part having a diameter such that the bolt head can pass therethrough.

11. The pedal support structure for the vehicle as claimed in claim 10, wherein:
said connecting surface bolt hole facilitates installation of said pedal bracket support part.

12. The pedal support structure for the vehicle as claimed in claim 5, further comprising:
a stopper bracket including an installation part having upper and lower parts and a pedal contacting portion provided at the lower part and the upper part being attached to said pedal bracket main body, and said pedal contacting portion regulating a pivotal movement of said pedal by contact of said pedal lever with said pedal contacting portion.

13. The pedal support structure for the vehicle as claimed in claim 5, wherein:
said connecting surface of said pedal bracket main body and said supporting surface of said pedal bracket support part horizontally extend in a lengthwise direction of the vehicle.

14. The pedal support structure for the vehicle as claimed in claim 5, wherein:
said main body rear end and said support part rear end are downwardly inclined planes extending in a rearward direction of the vehicle.

15. The pedal support structure for the vehicle as claimed in claim 5, wherein:
said connecting surface of said pedal bracket main body and said supporting surface of said pedal bracket support part are symmetrically provided with respect to a center axis of said pedal in a widthwise direction of said pedal.

16. The pedal support structure for the vehicle as claimed in claim 5, wherein:
said main body rear end and said supporting part rear end are symmetrically provided with respect to a center axis of said pedal in a widthwise direction of said pedal.

17. The pedal support structure for the vehicle as claimed in claim 5, wherein:
said connecting surface of said pedal bracket main body and said supporting surface of said pedal bracket support part are provided on a rear side with respect to where said bulkhead and said pedal bracket support part are connected with each other.

18. A pedal support structure for a vehicle comprising:
a toe board;
a catcher having a downwardly inclined surface facing said toe board and inclining in a rearward direction of the vehicle;
a pedal bracket connected to said toe board and extending in a lengthwise direction of the vehicle;
a pedal including a pedal lever pivotably supported on said pedal bracket; said pedal bracket including: a pedal bracket main body supporting said pedal lever and extending in a lengthwise direction of the vehicle, a front end of said pedal bracket main body connected to said toe board, a rear end of said pedal bracket main body opposing said downwardly inclined surface of said catcher, and said rear end being spaced apart from said downwardly inclined surface; and a guide member guiding the rear end of said pedal bracket main body toward said downwardly inclined surface of said catcher when an external force is applied from a front part of the vehicle to said toe board so that the rear end of said pedal bracket main body slides downwardly along said downwardly inclined surface of said catcher when the rear end of said pedal bracket main body moves further rearward; and
a bulkhead and a pedal bracket support part supported on said bulkhead, said pedal bracket support part having a supporting surface and flanges formed on lateral sides of said supporting surface so as to extend in the lengthwise direction of the vehicle, said supporting surface and said flanges constituting said guide member, said pedal bracket main body having a connecting surface, said supporting surface being superimposed on top of said connecting surface.

19. A pedal support structure for a vehicle comprising:
a toe board;
a catcher having a downwardly inclined surface facing said toe board and inclining in a rearward direction of the vehicle;
a pedal bracket connected to said toe board and extending in a lengthwise direction of the vehicle; and
a pedal including a pedal lever supported on said pedal bracket; said pedal bracket including:
a pedal bracket main body supporting said pedal lever and extending in a lengthwise direction of the vehicle, a front end of said pedal bracket main body connected to said toe board, a rear end of said pedal bracket main body opposing said downwardly inclined surface of said catcher, and said rear end being spaced apart from said downwardly inclined surface; and
a guide member guiding the rear end of said pedal bracket main body toward said downwardly inclined surface of said catcher when an external force is applied from a front part of the vehicle to said toe board so that the rear end of said pedal bracket main body slides downwardly along said downwardly inclined surface of said catcher when the rear end of said pedal bracket main body moves further rearward, and wherein said guide member is configured to limit lateral adjustment of the rear end of said pedal bracket main body when said guide member is guiding the rear end of said pedal bracket main body toward and into contact with said downwardly inclined surface, and wherein said guide member comprises a pair of flanges that extend lengthwise along opposite sides of said pedal bracket main body, and said flanges being spaced laterally apart a distance that limits lateral adjustment in said pedal bracket main body when said guide member is guiding the rear end of said pedal bracket main body toward said downwardly inclined surface.

20. A pedal support structure for a vehicle comprising:

a toe board;

a catcher having a downwardly inclined surface facing said toe board and inclining in a rearward direction of the vehicle;

a pedal bracket connected to said toe board and extending in a lengthwise direction of the vehicle; and a pedal including a pedal lever supported on said pedal bracket; said pedal bracket including:

a pedal bracket main body supporting said pedal lever and extending in a lengthwise direction of the vehicle, a front end of said pedal bracket main body connected to said toe board, a rear end of said pedal bracket main body opposing said downwardly inclined surface of said catcher, and said rear end being spaced apart from said downwardly inclined surface;

a guide member guiding the rear end of said pedal bracket main body toward said downwardly inclined surface of said catcher when an external force is applied from a front part of the vehicle to said toe board so that the rear end of said pedal bracket main body slides downwardly along said downwardly inclined surface of said catcher when the rear end of said pedal bracket main body moves further rearward, wherein said guide member is different from said catcher; and wherein said guide member comprises a pair of flanges that extend lengthwise along opposite sides of said pedal bracket main body, and said flanges being spaced laterally apart a distance that limits lateral adjustment in said pedal bracket main body when said guide member is guiding the rear end of said pedal bracket main body toward said downwardly inclined surface.

* * * * *